United States Patent [19]

Brandt

[11] Patent Number: 5,420,083

[45] Date of Patent: May 30, 1995

[54] WHISKER AND PARTICLE REINFORCED CERAMIC CUTTING TOOL MATERIAL

[75] Inventor: Gunnar Brandt, Solna, Sweden

[73] Assignee: Sandvik AB, Sandviken, Sweden

[21] Appl. No.: 180,337

[22] Filed: Jan. 12, 1994

[30] Foreign Application Priority Data

Jan. 15, 1993 [SE] Sweden .................. 9300120

[51] Int. Cl.$^6$ .............................................. C04B 35/81
[52] U.S. Cl. .............................. 501/95; 501/96; 501/97; 501/127; 51/307
[58] Field of Search ............ 501/95, 96, 97, 127; 51/307, 309

[56] References Cited

U.S. PATENT DOCUMENTS

| | | | |
|---|---|---|---|
| 4,249,914 | 2/1981 | Ogawa et al. | 501/127 X |
| 4,320,203 | 3/1982 | Brandt . | |
| 4,507,224 | 3/1985 | Toibana et al. | 252/376 |
| 4,867,761 | 9/1989 | Brandt et al. . | |
| 5,059,564 | 10/1991 | Mehrotra et al. | 501/89 |
| 5,141,901 | 8/1992 | Brandt . | |
| 5,250,477 | 10/1993 | Baldoni, II et al. | 501/97 X |

FOREIGN PATENT DOCUMENTS 01308881 12/1989 Japan .

OTHER PUBLICATIONS

T. N. Tiegs and P. F. Belcher, "Thermal Shock Behavior of an Alumina-SiC Whisker Composite", *J. Am. Ceram. Soc.*, 70 [5] C-109-C-11, 1987. No month.

M. Kanamaru, T. Tatsuno and T. Kusaka, "Hot-Pressed $Al_2O_3$/SiC Whisker/TiC Nano-Composites", *Journal of the Ceramic Society of Japan*, 100[4], 408-412, 1992. No month.

*Primary Examiner*—Karl Group
*Attorney, Agent, or Firm*—Burns, Doane, Swecker & Mathis

[57] ABSTRACT

There is now provided an oxide-based, preferably aluminum oxide based, matrix with 5–50, preferably 10–40% by volume of homogeneously dispersed whiskers based upon nitrides, carbides and/or borides of metals from group IVB (Ti,Zr,Hf) and/or VB (V,Nb,Ta) of the periodic system or solid solutions thereof and 1–20, preferably 3–8% by volume of particulate additions with a size <500 nm, preferably <200 nm, based upon carbides, nitrides and/or borides of metals from group IVB (Ti,Zr,Hf) and/or VB (V,Nb,Ta) of the periodic system or solid solutions thereof. The nanosize particulate additions are predominantly present inside the matrix grains and not in the grain boundaries.

20 Claims, No Drawings ic cutting tool materials and particularly to such cutting tool materials in which monocrystalline whiskers (hair crystals) together with small (significantly less than 1 μm) particles are uniformly distributed in a ceramic matrix which leads to an increased strength and toughness without negatively influencing the wear resistance of the material.

WHISKER AND PARTICLE REINFORCED CERAMIC CUTTING TOOL MATERIAL

BACKGROUND OF THE INVENTION

The present invention relates to ceramic cutting tool materials and particularly to such cutting tool materials in which monocrystalline whiskers (hair crystals) together with small (significantly less than 1 μm) particles are uniformly distributed in a ceramic matrix which leads to an increased strength and toughness without negatively influencing the wear resistance of the material.

Ceramic cutting tool materials have been available for several decades. However, until recently they have not had any significant commercial importance for use in chipforming machining. The main reason for the limited growth of ceramic cutting tools has been sudden and unexpected tool failures because of their inherent inadequate strength and toughness.

In recent years, the properties of ceramic cutting tool materials have been improved in many respects and their use in cutting of cast iron and heat-resistant alloys (e.g., nickel-base alloys) has relatively increased. The proportion of ceramic cutting inserts is still very small, however, where steel is the dominating work piece material being machined because steel makes large simultaneous demands upon strength, toughness and wear resistance which have not been fulfilled by currently known ceramic cutting tool materials.

Aluminum oxide-based cutting tool materials are very sensitive to thermal crack formation because aluminum oxide in itself has a relatively poor thermal conductivity. This leads to very short tool lives in machining steel, particularly under conditions with short operating times and varying cutting depth.

To a certain extent, the thermal properties have been improved by additions of titanium carbide and/or titanium nitride which enhance the thermal conductivity of the tool material. The addition of titanium carbide/nitride also increases the hardness of the material. In comparison with pure aluminum oxide materials, an increased tool life is therefore obtained in the cutting of harder work piece materials and in operations demanding thermal shock resistance. However, this kind of material has too poor a toughness behavior for a more general use in the cutting of steel.

A later development relates to alloying of uniformly dispersed fine-grained zirconium oxide particles in a matrix of aluminum oxide. A transformation of the 'metastable' zirconium oxide particles during use increases both strength and toughness and thus leads to a more predictable tool life.

The thermal properties of said type of materials are, however, only slightly better than those of pure aluminum oxide materials. Therefore, initiation and growth of thermally induced cracks is still a great problem in practical cutting operations generating high curing edge temperatures such as cutting of steel.

It has recently been shown (T. N. Tiegs and P. F. Belcher, J. Am. Ceram. Soc. 90(5) C-109-C-11, 1987) that alloying of SiC-whiskers, with monocrystalline hair crystals, in a matrix of aluminum oxide leads to a greatly improved fracture toughness and strength. Ceramic cutting tool materials based upon said concept have shown very good performance in the cutting of heat-resistant materials in particular but in the cutting of steel they have shown surprisingly short tool lives because of preferential attack of the SiC-crystals. This leads to a weakening of the surface zone with accompanying high wear and risks of crack initiation.

U.S. Pat. No. 4,867,761 discloses oxide-based ceramic cutting tool materials strengthened by whiskers of carbides, nitrides and borides of Ti and Zr or solid solutions thereof having a low solubility in steel resulting in a cutting tool material with an improved and more predictable toughness as well as improved strength and resistance to thermal shocks without deterioration of the wear resistance to any appreciable degree particularly when machining steel. This has not been possible with earlier known material compositions.

In U.S. Pat. No. 5,141,901 further improvements have been achieved using whiskers of nitrides, carbides and/or borides of Ta. These whiskers have a much lower thermal expansion coefficient than the alumina matrix material which leads to further improvements of toughness and thermal shock resistance. The mechanisms are not known but depend probably on a favorable situation with respect to internal stresses in the composite material.

It has recently been found (M. Kanamaru, T. Tatsuno and T. Kasuka, "Hot Pressed $Al_2O_3$/SiC Whisker/TiC Nano-Composites", Journal of The Ceramic Society of Japan, 100(4), 408–412, 1992) that further improvements of the properties are possible in the whisker-reinforced cutting tool materials, especially the strength, if small additions of nanosize particles are added to the whisker reinforced materials.

It is well-known that particulate additions can be used to improve the properties of a brittle ceramic material, for example, U.S. Pat. No. 4,320,203 which refers to additions of TiN and Ti(C,N).

Depending on the nature of the additions the operating toughening mechanisms can be crack deflection, microcracking, transformation toughening or crack bridging. It is characteristic for these particulate additions that the size of the particles are of the same order of magnitude as the matrix material e.g., in the order of 1–5 μm and that they are located in the grain boundaries of the matrix material. Only in the case of $ZrO_2$-additions is a smaller grain size than the matrix needed in order to suppress a transformation during fabrication of the material. However, the zirconia particles are still predominantly located in the grain boundaries of the alumina matrix material.

It is also characteristic for the particulate reinforced materials that property improvements are achieved up to rather high particulate contents, normally up to 15–30 percent by volume.

OBJECTS AND SUMMARY OF THE INVENTION

It is an object of this invention to avoid or alleviate the problems of the prior art.

It is thus an object of the invention to obtain a ceramic material for chipforming machining, particularly of steel, in which the above-mentioned weaknesses of today's known aluminum oxide based cutting tool materials have been eliminated.

In one aspect of the invention there is provided a ceramic cutting tool material comprising a ceramic matrix with 5–50% by volume of homogeneously dispersed whiskers based upon nitrides, carbides and/or borides of metals from group IVB (Ti,Zr,Hf) and/or VB (V,Nb,Ta) of the periodic system or solid solutions thereof and 1-20% by volume of particulate additions with a size <500 nm based upon carbides, nitrides and/or borides of metals from group IVB (Ti,Zr,Hf) and/or VB (V,Nb,Ta) of the periodic system or solid solutions thereof, said particulate additions being predominantly located in the matrix grains and not in the grain boundaries.

DETAILED DESCRIPTION OF THE PREFERRED EMBODIMENTS OF THE INVENTION

According to the present invention it has surprisingly been found that additions of very small particles (typically smaller than 0.2 μm) characterized in that they are predominantly (e.g., at least 55%, preferably at least 75%) located inside the matrix grains significantly increase the strength of the composite material even if the material already contains whiskers which already have caused a significant strengthening, provided that the nanoparticles and whiskers are based upon carbides, nitrides and/or borides of metals from group IVB (Ti,Zr,Hf) and/or VB (V,Nb,Ta) of the periodic system or solid solutions thereof. The strengthening effect is obtained already at very low particulate additions, typically about 5 percent by volume, and higher contents do not further improve the strengthening effect but rather decrease it. Thus, in materials according to the invention, there is a unique combination of strength, a toughness thermal shock resistance and wear resistance, which has not been possible to obtain with earlier known ceramic cutting tool materials.

It therefore seems that the operating mechanism(s) differ from those observed when using larger particulates predominantly located in the grain boundaries of the matrix.

The ceramic cutting tool material according to the present invention comprises an oxide-based, preferably aluminum oxide-based, matrix with 5-50%, preferably 10-40%, most preferably 25-35%, by volume of homogeneously dispersed whiskers based upon nitrides, carbides and/or borides of metals from group IVB (Ti,Zr,Hf) and/or VB (V,Nb,Ta) of the periodic system or solid solutions thereof and 1-20%, preferably 3-8%, by volume of particulate additions smaller than 500 nm, preferably <200 nm, based upon carbides, nitrides and/or borides of metals from group IVB (Ti,Zr,Hf) and/or VB (V,Nb,Ta) of the periodic system or solid solutions thereof. The whiskers are monocrystals with a diameter of 0.5-10 μm and a length of 2.5-100 μm with a length/diameter ratio preferably of 5-10. The whiskers may at least partly be replaced by monocrystal platelets with a diameter of 5-20 μm and a thickness of 0.5-4 μm. The matrix shall consist essentially of ceramic oxides, preferably alumina, or of ceramic oxides mixed with hard carbides and/or nitrides and/or borides and/or binder metal. The grain size of the matrix shall be <10 μm, preferably <4 μm.

The nanosize compounds may contain oxygen up to 5 weight % and may be stoichiometric as well as nonstoichiometric.

The material may further contain zirconium oxide particles up to 20 weight %, which may further increase strength and fracture toughness.

All of the particulate additions have been chosen based on the criteria that they all have a low solubility in steel which is one necessary prerequisite for a good wear resistance. It is, however, observed that the strengthening effect due to particulate addition may vary depending on specific properties of the particulate. It has been observed that TiN is less effective than TaN when added in same amounts and approximately same particulate sizes. This is interpreted as a result of favorable residual stresses in the case of TaN which is the preferred addition material.

Alumina, the matrix material, has a thermal expansion coefficient in the order of $8 \cdot 10^{-6} K^{-1}$ (300-1300K). The thermal expansion coefficient of TiN is only slightly higher but considerably lower for TaN (in the order of $5 \cdot 10^{-6} K^{-1}$). Thus upon cooling of the composite after sintering no or only very small strains are expected by the use of TiN-particles. However, TaN will give rise to tensile stresses in the alumina matrix (and compressive stresses in the TaN-particles) due to the thermal expansion mismatch.

The invention has been described with reference to an oxide-based matrix. However, the same favorable results may also be obtained for a nitride-based matrix such as $Si_3N_4$.

The cutting material according to the invention is made by wet milling and mixing of matrix powder, nanosize powder, whisker and/or platelets and conventional sintering aids. After drying the mixture is pressed to desired geometrical form and sintered to near theoretical density, and after the sintering the possible remaining porosity can be further reduced using hot isostatic pressing. If it is not possible to obtain a closed porosity by pressureless sintering, the material can be pressure sintered with a suitable graphite tool or after encapsulation be hot isostatically pressed to desired density. The sintering conditions depend upon the raw-material and is chosen so that the material reaches a density which exceeds 98%, preferably 99.5% of theoretical density.

The invention is additionally illustrated in connection with the following Examples which are to be considered as illustrative of the present invention. It should be understood, however, that the invention is not limited to the specific details of the Examples.

EXAMPLE 1

0%, 5%, 10% and 20% by volume of nanosize (50 nm) TiN-powder are wet-mixed with 30% by volume of titanium nitride whiskers (average diameter 0.9 μm) and the balance a mixture of 95.5% by weight of $Al_2O_3$, 4.2% by weight of $ZrO_2$ and 0.3% by weight of MgO. After drying in vacuum, the mixtures are hot-pressed to discs at 1600° C. to >99% of theoretical density. Small test bars are cut from the hot pressed disc in order to evaluate the transverse rupture strength (TRS) in three-point bending test. The test bars are polished before testing.

Fracture toughness ($K_{1c}$) is also evaluated by means of a conventional indentation method. In said method, an indentation is made by means of a pyramid diamond tip and fracture toughness is calculated from the size of the cracks produced from the corners of the indentation.

Strength and fracture toughness values are given in Table 1.

TABLE 1

| | TRS, MPa | $K_{1c}$ MPam$^{\frac{1}{2}}$ |
|---|---|---|
| 1. $Al_2O_3$ + 4.2% by weight $ZrO_2$ + 0.3% by weight MgO + 30% by volume TiN-whiskers | 770 | 6.1 |
| 2. $Al_2O_3$ + 4.2% by weight $ZrO_2$ + | 1130 | 6.2 |

TABLE 1-continued

|  | TRS, MPa | $K_{1c}$ MPam$^{\frac{1}{2}}$ |
| --- | --- | --- |
| 0.3% by weight MgO + 30% by volume TiN-whiskers + 5% by volume TiN-nanosize particles |  |  |
| 3. Al$_2$O$_3$ + 4.2% by weight ZrO$_2$ + 0.3% by weight MgO + 30% by volume TiN-whiskers + 10% by volume TiN-nanosize particles | 1075 | 5.9 |
| 4. Al$_2$O$_3$ + 4.2% by weight ZrO$_2$ + 0.3% by weight MgO + 30% by volume TiN-whiskers + 20% by volume TiN-nanosize particles | 950 | 6.0 |

From Table 1, it is evident that already small additions of nanozize particles give significant strengthening but fracture toughness is not very much affected. Increased strength means that the risk of tool failure due to overloading of the insert is decreased and consequently the reliability is improved.

EXAMPLE 2

0%, 5%, 10% and 20% by volume of nanosize (100 nm) TaN-powder are wet-mixed with 30% by volume of titanium nitride whiskers (average diameter 0.9 μm) and the balance a mixture of 95.5% by weight of Al$_2$O$_3$, 4.2% by weight of ZrO$_2$ and 0.3% by weight of MgO. After drying in vacuum the mixtures are hot-pressed to discs at 1600° C. to >99% of theoretical density. Small test bars are cut from the hot pressed disc in order to evaluate the transverse rupture strength (TRS) in three-point bending test. The test bars are polished before testing.

Fracture toughness ($K_{1c}$) is also evaluated by means of the indentation method of Example 1.

Strength and fracture toughness values are given in Table 2.

TABLE 2

|  | TRS, MPa | $K_{1c}$ MPam$^{\frac{1}{2}}$ |
| --- | --- | --- |
| 1. Al$_2$O$_3$ + 4.2% by weight ZrO$_2$ + 0.3% by weight MgO + 30% by volume TiN-whiskers | 770 | 6.1 |
| 2. Al$_2$O$_3$ + 4.2% by weight ZrO$_2$ + 0.3% by weight MgO + 30% by volume TiN-whiskers + 5% by volume TaN-nanosize particles | 1210 | 6.4 |
| 3. Al$_2$O$_3$ + 4.2% by weight ZrO$_2$ + 0.3% by weight MgO + 30% by volume TiN-whiskers + 10% by volume TaN-nanosize particles | 1155 | 6.1 |
| 4. Al$_2$O$_3$ + 4.2% by weight ZrO$_2$ + 0.3% by weight MgO + 30% by volume TiN-whiskers + 20% by volume TaN-nanosize particles | 955 | 5.9 |

It is evident from Table 2 that TaN additions are more effective in increasing the strength but the effect on fracture toughness is also very small.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A ceramic cutting tool material comprising a ceramic matrix with 5-50% by volume of homogeneously dispersed whiskers based upon nitrides, carbides and/or borides of metals from group IVB (Ti,Zr,Hf) and/or VB (V,Nb,Ta) of the periodic system or solid solutions thereof and 1-20% by volume of particulate additions with a size <500 nm based upon carbides, nitrides and/or borides of metals from group IVB (Ti,Zr,Hf) and/or VB (V,Nb,Ta) of the periodic system or solid solutions thereof, said particulate additions being predominantly located in the matrix grains and not in the grain boundaries.

2. The ceramic cutting tool material of claim 1 wherein the ceramic comprises aluminum oxide.

3. The ceramic cutting tool material of claim 1 wherein the ceramic matrix contains 10-40% by volume of said whiskers.

4. The ceramic cutting tool material of claim 1 wherein the ceramic matrix contains 3-8% by volume of said particulate additives.

5. The ceramic cutting tool material of claim 4 wherein the ceramic matrix contains 10-40% by volume of said whiskers.

6. The ceramic cutting tool material of claim 1 wherein the ceramic comprises Si$_3$N$_4$.

7. The ceramic cutting tool material of claim 1 wherein the whiskers and particulate additions are both based upon nitrides of group IVB and/or VB metals.

8. The ceramic cutting tool material of claim 1 wherein the whiskers comprise TiN.

9. The ceramic cutting tool material of claim 1 wherein the particulate additions comprise TaN.

10. The ceramic cutting tool material of claim 1 wherein the material contains said particulate additions with a size <200 nm.

11. The ceramic cutting tool material of claim 1 wherein the particulate additions have a lower coefficient of thermal expansion than the ceramic matrix.

12. The ceramic cutting tool material of claim 1 wherein at least 55% of the particulate additions are present inside the matrix grains.

13. The ceramic cutting tool material of claim 1 wherein at least 75% of the particulate additions are present inside the matrix grains.

14. The ceramic cutting tool material of claim 1 wherein the whiskers have a diameter of 0.5-10 μm, a length of 2.5-100 μm and a length/diameter ratio of 5-10.

15. The ceramic cutting tool material of claim 1 further comprising monocrystal platelets partly replacing the whiskers.

16. The ceramic cutting tool material of claim 1 further comprising monocrystal platelets partly replacing the whiskers, the platelets having a diameter of 5-20 μm and a thickness of 0.5-4 μm.

17. The ceramic cutting tool material of claim 1 wherein the ceramic matrix has a grain size of <10 μm.

18. The ceramic cutting tool material of claim 1 wherein the ceramic matrix has a grain size of <4 μm.

19. The ceramic cutting tool material of claim 1 further comprising up to 20 wt. % of zirconium oxide particles.

20. The ceramic cutting tool material of claim 1 wherein the ceramic matrix is a ceramic oxide matrix.

* * * * *